(12) United States Patent
Ogawa (10) Patent No.: US 9,557,729 B2
(45) Date of Patent: Jan. 31, 2017

(54) TOOL TRAJECTORY DISPLAY DEVICE INCLUDING DISPLAY UNIT FOR TRAJECTORY DATA

(71) Applicant: FANUC Corporation, Yamanashi (JP)

(72) Inventor: Hajime Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 166 days.

(21) Appl. No.: 14/506,745

(22) Filed: Oct. 6, 2014

(65) Prior Publication Data

US 2015/0100150 A1 Apr. 9, 2015

(30) Foreign Application Priority Data

Oct. 7, 2013 (JP) .................................. 2013-210587

(51) Int. Cl.
*G06F 19/00* (2011.01)
*G05B 19/19* (2006.01)

(52) U.S. Cl.
CPC ..... *G05B 19/19* (2013.01); *G05B 2219/50047* (2013.01)

(58) Field of Classification Search
CPC ....................... G05B 19/19; G05B 2219/50047
See application file for complete search history.

(56) References Cited

U.S. PATENT DOCUMENTS

| | | | |
|---|---|---|---|
| 5,285,394 A * | 2/1994 | Montalcini | G05B 19/4103 700/189 |
| 2005/0171733 A1 | 8/2005 | Hough | |
| 2009/0003653 A1 * | 1/2009 | Takahata | G06T 7/2093 382/103 |
| 2011/0202167 A1 * | 8/2011 | Iwashita | G05B 19/404 700/187 |
| 2013/0138236 A1 * | 5/2013 | Nagaoka | G05B 19/19 700/108 |
| 2014/0180467 A1 * | 6/2014 | Sato | G05B 19/18 700/184 |

FOREIGN PATENT DOCUMENTS

| | | |
|---|---|---|
| DE | 4229720 A1 | 5/1993 |
| DE | 102011011661 A1 | 8/2011 |
| JP | H02-257308 A | 10/1990 |
| JP | 2006-227886 A | 8/2006 |
| JP | 2013-069231 A | 4/2013 |

\* cited by examiner

*Primary Examiner* — Michael D Masinick
(74) *Attorney, Agent, or Firm* — Hauptman Ham, LLP (57) ABSTRACT

The tool trajectory display device (10) includes: a start point coordinate storing unit (13) that stores a plurality of coordinate positions of a drive shaft as start point coordinate positions; a movement amount determining unit (14) that determines a movement amount of the drive shaft from a first start point coordinate position to a second start point coordinate position; a trajectory calculation unit (15) that calculates a first actual trajectory of a tool tip point of the machine tool from the actual position based on the first start point coordinate position after adding the movement amount and the repetition portion, and that calculates a second actual trajectory of the tool tip point from the actual position based on the second start point coordinate position and the repetition portion; and a display unit (16) that superimposedly displays the first and the second actual trajectories.

4 Claims, 7 Drawing Sheets

| G91 G00;<br>X100.0 Y100.0 F1000.; | START POINT<br>COORDINATE POSITION | (100.0, 100.0) |
| G91 G01 · · · ·;<br>· · · · · · · · ·;<br>· · · · · · · · ·; | BASIC UNIT | (REPETITION PORTION) |
| Y100.0 F1000.; | START POINT<br>COORDINATE POSITION | (100.0, 200.0) |
| G91 G01 · · · ·;<br>· · · · · · · · ·;<br>· · · · · · · · ·; | BASIC UNIT | (REPETITION PORTION) |
| Y100.0 F1000.; | START POINT<br>COORDINATE POSITION | (100.0, 300.0) |
| G91 G01 · · · ·;<br>· · · · · · · · ·;<br>· · · · · · · · ·; | BASIC UNIT | (REPETITION PORTION) |

TOOL TRAJECTORY DISPLAY DEVICE INCLUDING DISPLAY UNIT FOR TRAJECTORY DATA

RELATED APPLICATIONS

The present application claims priority to Japanese Application Number 2013-210587, filed Oct. 7, 2013, the disclosure of which is hereby incorporated by reference herein in its entirety.

BACKGROUND OF INVENTION

1. Technical Field

The present invention relates to a tool trajectory display device that displays a trajectory of a representative point of a machine tool, such as a tool tip point.

2. Description of Related Art

Conventionally, an instruction trajectory of a representative point of a machine tool, such as a tip point, is displayed, being superimposed on a feedback trajectory obtained by actually moving the representative point of the machine tool, such as a tip point, according to the instruction, to visually observe an error in the feedback trajectory with respect to the instruction trajectory.

For example, Japanese Unexamined Patent Publication No. 2013-69231 discloses displaying a latest feedback trajectory superimposed on a prior feedback trajectory. In other words, Japanese Unexamined Patent Publication No. 2013-69231 discloses a technique of displaying on a display unit a plurality of superimposed pieces of trajectory data that have almost identical machining start positions and different machining conditions. Therefore, Japanese Unexamined Patent Publication No. 2013-69231 is advantageous in displaying a plurality of pieces of trajectory data with changed machining conditions, whereby the change in the trajectory data can be visually analyzed.

Machining of a particular workpiece, for example, blades of an impeller, requires repetitive machining of an identical shape. Specifically, after machining a blade of an impeller, the impeller is rotated around the rotational axis by a predetermined angle to machine another blade of the impeller in the same way, and this task is repeated.

The trajectory followed by such machining includes repetition portions with a plurality of rotated start positions. As such, the trajectory display device is required to display on the display unit a plurality of repetition portions with identical machining conditions and different machining start positions. Further, the same is true when machining is performed in accordance with a trajectory that has repetition portions with a plurality of translated start positions.

Although Japanese Unexamined Patent Publication No. 2013-69231 can display a plurality of superimposed pieces of trajectory data with almost identical machining start positions and different machining conditions on the same coordinate system, it is difficult for Japanese Unexamined Patent Publication No. 2013-69231 to display a plurality of superimposed pieces of trajectory data with the identical machining conditions and different machining start positions on the same coordinate system. As such, when machining a workpiece that requires repetition of similar machining, the trajectory display device disclosed in Japanese Unexamined Patent Publication No. 2013-69231 can neither compare nor evaluate in the same coordinates with high precision whether the shapes of the repetition portions are identical.

The present invention has been made in consideration of the above problem, and has an objective of providing a tool trajectory display device that can easily compare the shapes of the repetition portions of the trajectories when a machining program includes a plurality of repetition portions for repeatedly processing identical or symmetric shapes.

SUMMARY OF THE INVENTION

To achieve the above-described objective, according to a first aspect, provided is a tool trajectory display device including: a numerical control device that controls at least one drive shaft of a machine tool based on an instruction position in a machining program; an actual position data acquisition unit that acquires an actual position of the at least one drive shaft controlled by the numerical control device; a start point coordinate storing unit that stores a plurality of coordinate positions of the at least one drive shaft as start point coordinate positions upon initiation of executing a plurality of repetition portions included in the machining program for repeatedly machining identical shapes and symmetric shapes; a movement amount determining unit that determines a movement amount of the at least one drive shaft from a first start point coordinate position to a second start point coordinate position among the plurality of start point coordinate positions stored in the start point coordinate storing unit; a trajectory calculation unit that calculates a first actual trajectory of a tool tip point of the machine tool from the actual position acquired by the actual position data acquisition unit based on the first start point coordinate position after adding the movement amount and a repetition portion corresponding to the first start point coordinate position, and that calculates a second actual trajectory of the tool tip point from the actual position based on the second start point coordinate position and a repetition portion corresponding to the second start point coordinate position; and a display unit that superimposes and displays the first actual trajectory and the second actual trajectory calculated by the trajectory calculation unit.

According to a second aspect, the at least one drive shaft in the first aspect is a linear axis so that the coordinate positions stored in the start point coordinate storing unit can be translated along the linear axis.

According to a third aspect, the at least one drive shaft in the first aspect is a rotational axis so that the coordinate positions stored in the start point coordinate storing unit can be rotated around the rotational axis.

According to a fourth aspect, in the first aspect, the trajectory calculation unit further calculates an instruction trajectory of the tool tip point based on the instruction position in the machining program, and the display unit displays the instruction trajectory superimposed on the first actual trajectory and the second actual trajectory.

These and other objectives, features and advantages of the present invention will be understood more clearly from the detailed description of preferable embodiments of the present invention as illustrated in the appended drawings.

DETAILED DESCRIPTION

The following will describe the embodiments of the present invention with reference to the appended drawings. In the following drawings, like elements are denoted by like reference signs. For easier comprehension, the scales of the drawings have been changed as necessary.

Figure 1:
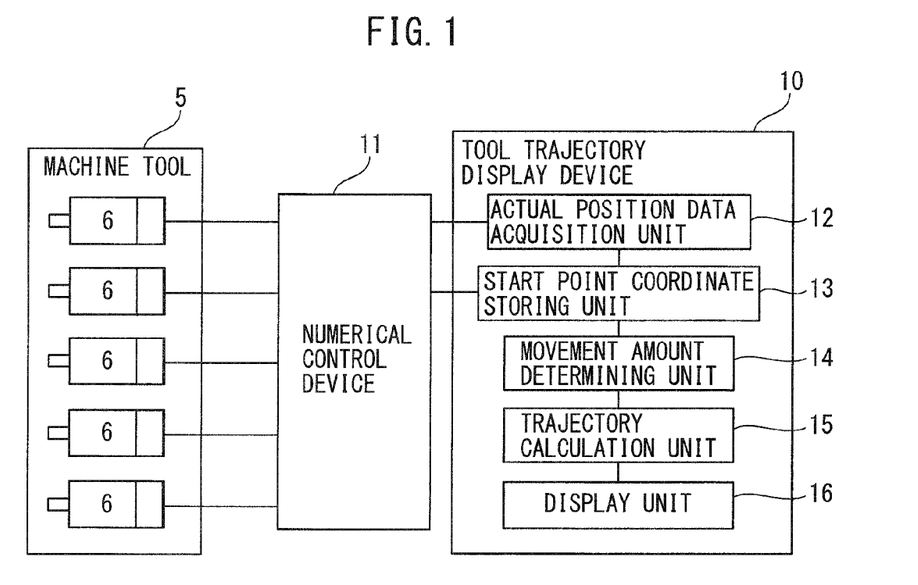
FIG. 1 is a schematic diagram of a tool trajectory display device according to the present invention.

FIG. 1 is a schematic diagram of a tool trajectory display device according to the present invention. As depicted in FIG. 1, the tool trajectory display device 10 is connected to the machine tool 5. The machine tool 5 includes at least one drive shaft, for example, five drive shafts 6 of servo motors and the like according to FIG. 1. The drive shafts 6 are controlled by a numerical control device 11 according to the instruction positions in a machining program. The numerical control device 11 performs feedback control of each drive shaft 6 based on the instruction positions in the machining program.

The machining program is used by the machine tool 5 for machining a workpiece, and stored in, for example, the numerical control device 11. In the present invention, the machining program includes repetition portions that are programmed so as to machine a plurality of identically shaped portions or a plurality of symmetrically shaped portions from a workpiece. Such repetition portions can be a basic unit of a machining program when cutting a plurality of predetermined shape portions from a workpiece or when machining a plurality of blades of an impeller from a workpiece.

As depicted in FIG. 1, the tool trajectory display device 10 includes an actual position data acquisition unit 12 that acquires actual positions of at least one drive shaft 6 that is controlled by the numerical control device 11 from measurement means (not depicted) such as an encoder, or the numerical control device 11. Further, the actual position data acquisition unit 12 can acquire instruction positions of each drive shaft 6 from the machining program via the numerical control device 11. Further, the instruction positions of each drive shaft 6 generated by the numerical control device 11 from the machining program and parameters can be acquired from the numerical control device 11.

The tool trajectory display device 10 further includes: a start point coordinate storing unit 13 that stores a plurality of coordinate positions of at least one drive shaft 6 upon respective initiation of executing a plurality of repetition portions as start point coordinate positions; and a movement amount determining unit 14 that determines a movement amount of at least one drive shaft 6 from a first start point coordinate position to a second start point coordinate position among the plurality of start point coordinate positions stored in the start point coordinate storing unit 13.

Further, the tool trajectory display device 10 includes a trajectory calculation unit 15 that calculates a feedback trajectory of a representative point of a tool, for example, the tool tip point 3, based on the actual positions. Specifically, the trajectory calculation unit 15 adds the movement amount determined by the movement amount determining unit 14 to the first start point coordinate position, and calculates the first actual trajectory of the tool tip point 3 of the machine tool 5 from the actual positions based on the first start point coordinate position after the addition and the repetition portion corresponding to the first start point coordinate position. Further, the trajectory calculation unit 15 calculates the second actual trajectory of the tool tip point 3 from the actual positions based on the second start point coordinate position of at least one drive shaft 6 and the repetition portion corresponding to the second start point coordinate position.

Further, the trajectory calculation unit 15 may calculate the instruction trajectory of the tool tip point 3 based on the instruction positions in the machining program or the instruction positions generated by the numerical control device 11 from the machining program and parameters, and on the information of the machine configuration of the machine tool 5. As will be described later, the first actual trajectory, the second actual trajectory, and the instruction trajectory calculated by the trajectory calculation unit 15 may be superimposedly displayed on the display unit 16, such as a Cathode Ray Tube (CRT) monitor or a liquid crystal display, of the tool trajectory display device 10.

Figure 2:
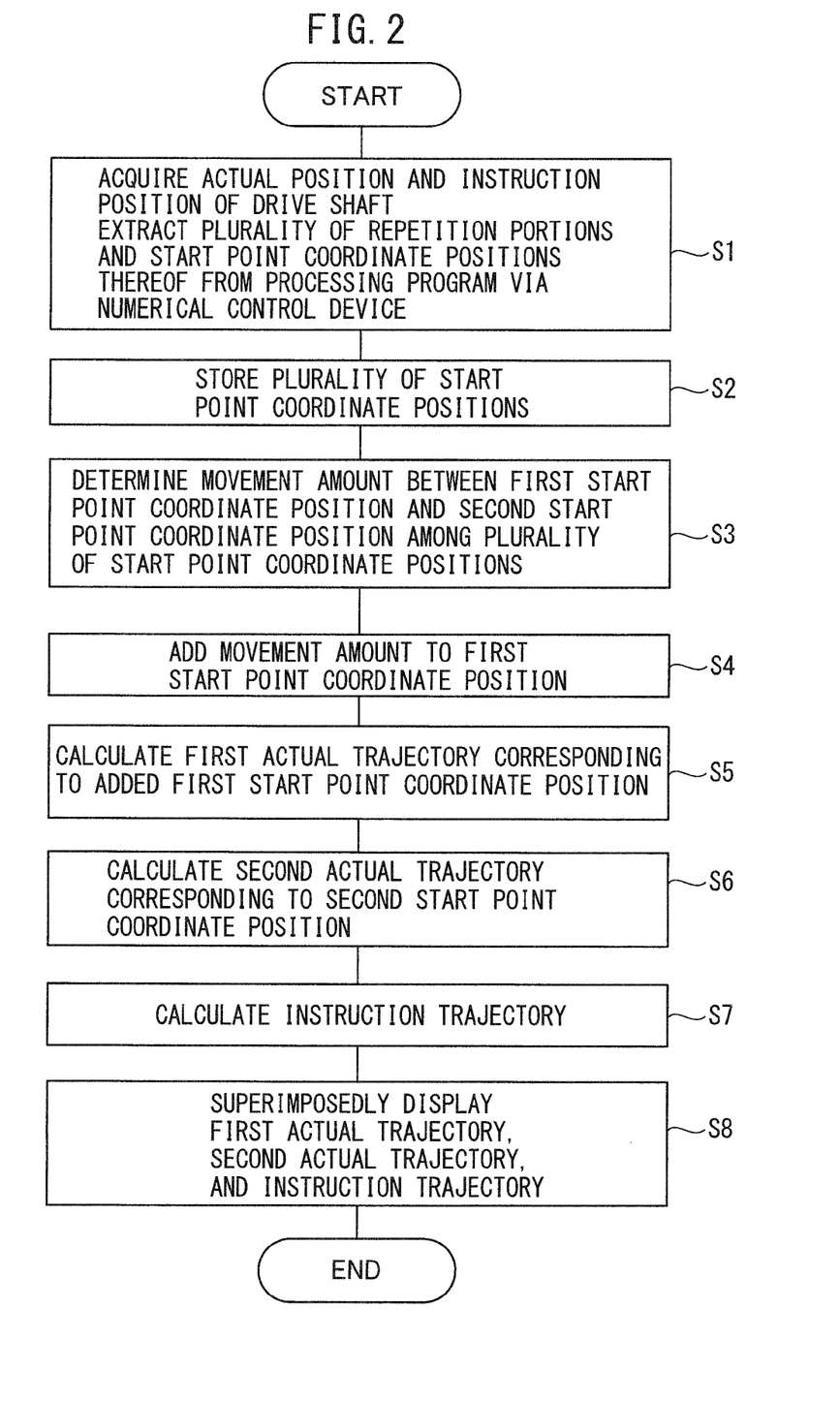
FIG. 2 is a flowchart of the operation of the tool trajectory display device according to the present invention.
Figure 3:
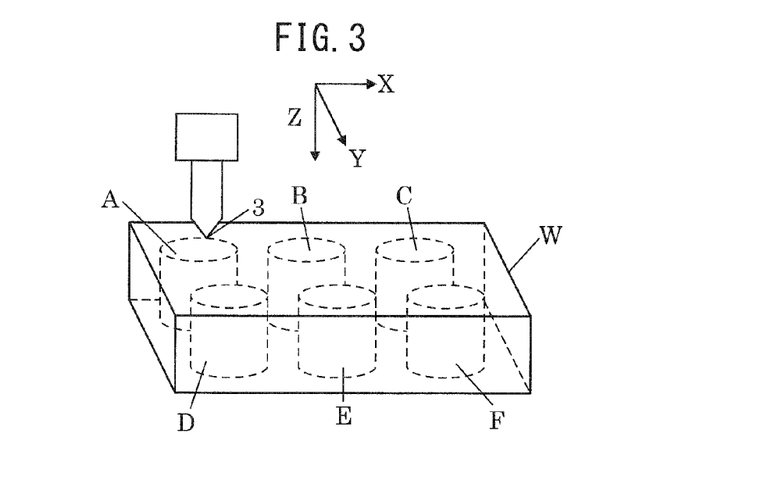
FIG. 3 is a diagram depicting an example of a tool and a workpiece.
Figure 4:
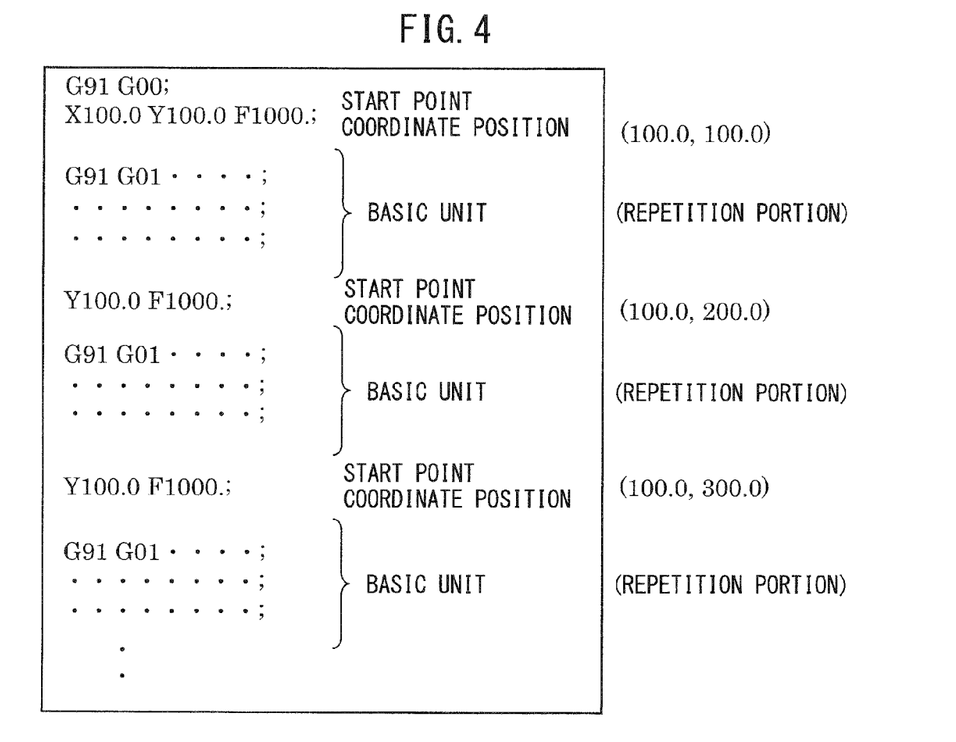
FIG. 4 is a diagram depicting a portion of a machining program used in the example depicted in FIG. 3.

FIG. 2 is a flowchart depicting the operation of the tool trajectory display device according to the present invention. FIG. 3 is a diagram depicting an example of a tool and a workpiece, which depicts when machining is performed with a three-axis linear motion machining center. Further, FIG. 4 is a diagram depicting a portion of the machining program in the example depicted in FIG. 3. The following will describe the operation of the tool trajectory display device 10 according to the present invention with reference to FIGS. 2 to 4.

At step S1 of FIG. 2, initially, the actual position data acquisition unit 12 not only acquires the actual positions of at least one drive shaft 6 through the numerical control device 11, but also acquires instruction positions from the machining program through the numerical control device 11. Further, the actual position data acquisition unit 12 acquires the information of the machine configuration of the machine tool 5. At this time, a plurality of repetition portions and the start point coordinate positions thereof are extracted from the machining program of the machine tool 5 through the numerical control device 11.

As depicted in FIG. 3, an embodiment of the present invention assumes a case of cutting six cylindrical portions A to F of an identical shape from a rectangular parallelepiped workpiece W. As can be seen from FIG. 3, the cylindrical portions A to F are arrayed in two rows and three columns in the workpiece W.

In the machining program depicted in FIG. 4, corresponding "basic unit (repetition portion)" is described following each of a plurality of "start point coordinate positions". The start point coordinate position is a coordinate of the drive shaft 6 of the machine tool 5 upon initiation of machining a repetition portion. Further, the plurality of repetition portions are described in the same way as one another, which are machining instructions for cutting cylindrical portions A to F as depicted in FIG. 3. At step S1, such repetition portions and corresponding start point coordinate positions are extracted. Then, at step S2, the extracted start point coordinate positions are stored in the start point coordinate storing unit 13.

Then, an operator selects some of the plurality of start point coordinate positions. The following will describe the embodiment based on the assumption that the start point coordinate positions corresponding to two cylindrical portions A and F as depicted in FIG. 3 are selected. It should be noted that three or more start point coordinate positions may also be selected.

At step S3, the movement amount determining unit 14 determines the movement amount between the selected two start point coordinate positions. While the start point coordinate positions are a part of the instruction positions, the movement amount between the actual positions can also be employed by calculating the coordinates of the actual positions corresponding to the start point coordinate positions.

Figure 5:
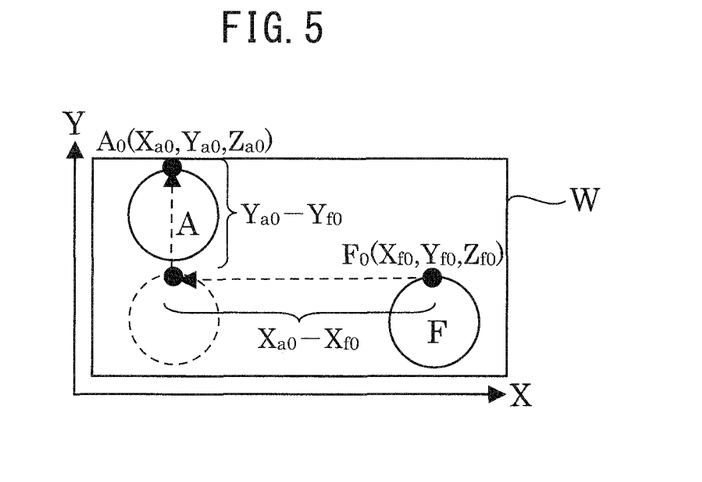
FIG. 5 is a diagram illustrating the determination of a movement.

FIG. 5 is a diagram illustrating determination of the movement amount. FIG. 5 depicts the start point coordinate position A0 (Xa0, Ya0, Za0) of the cylindrical portion A and the start point coordinate position F0 (Xf0, Yf0, Zf0) of the cylindrical portion F. As can be seen from FIG. 5, the movement amount determining unit 14 determines both the movement amount (Xa0−Xf0) of X direction and the movement amount (Ya0−Yf0) of Y direction. It should be noted that, in the example depicted in FIG. 5, since the machining start position is on the surface of the workpiece W, the movement amount in Z direction is not necessary.

Then, at step S4 of FIG. 2, the trajectory calculation unit 15 adds the movement amount calculated by the movement amount determining unit 14 to the first start point coordinate position. Then, at step S5, the trajectory calculation unit 15 calculates the repetition portion corresponding to the first start point coordinate position after the addition. Subsequently, based on the first start point coordinate position after the addition and the repetition portion corresponding thereto, the first actual trajectory of the tool tip point 3 of the machine tool 5 is calculated from the actual positions acquired by the actual position data acquisition unit 12. The first actual trajectory corresponds to the actual trajectory when the cylindrical portion F is machined.

Then, at step S6, the trajectory calculation unit 15 calculates the repetition portion corresponding to the second start point coordinate position. Subsequently, based on the second start point coordinate position and the repetition portion corresponding thereto, the second actual trajectory of the tool tip point 3 of the machine tool 5 is calculated from the actual positions acquired by the actual position data acquisition unit 12. The second actual trajectory corresponds to the actual trajectory when the cylindrical portion A is machined.

Subsequently, at step S7, the trajectory calculation unit 15 calculates the instruction trajectory of the tool tip point 3 based on the instruction positions in the machining program or the instruction positions generated by the numerical control device 11 from the machining program and parameters. In such a case, the instruction trajectory corresponding to the cylindrical portion A is preferably calculated.

Figure 6:
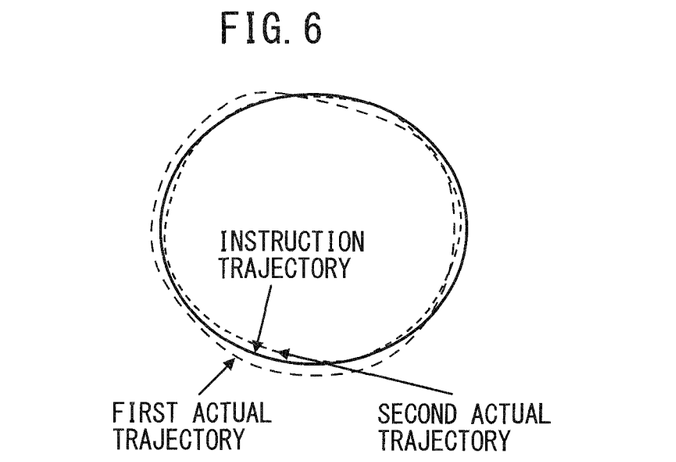
FIG. 6 is a diagram depicting a trajectory displayed on a display unit.

As the movement amount has been added at step S4, the first actual trajectory is shifted from the position of the cylindrical portion F to the position of the cylindrical portion A. Then, at step S8, when displaying the first actual trajectory and the second actual trajectory on the display unit 16, the first actual trajectory and the second actual trajectory almost overlap as depicted in FIG. 6. At this time, the instruction trajectory may also be simultaneously displayed. In such a case, the instruction trajectory represents a common instruction trajectory for the first actual trajectory and the second actual trajectory.

As such, in the present invention, the first actual trajectory for one repetition portion and the second actual trajectory for another repetition portion can be superimposedly displayed. In this way, the shape of the first actual trajectory and the shape of the second actual trajectory can be easily compared with high precision. Therefore, a problematic point in the first actual trajectory and the second actual trajectory can be appropriately grasped, and such a point can be eliminated as necessary by adjusting various parameters.

Further, the instruction trajectory and at least one of the first actual trajectory and second actual trajectory may be superimposedly displayed. In such a case, how far the at least one actual trajectory is deviated from the instruction trajectory or the other actual trajectory can be grasped. The first actual trajectory, the second actual trajectory, and the instruction trajectory are preferably in different colors or of different line types to facilitate easier understanding for an operator.

It should be appreciated that the actual trajectories of other cylindrical portions B to E may also be calculated and superimposedly displayed in the same way. Therefore, the actual trajectories of the cylindrical portions A to F that are acquired from a single workpiece W can be compared to grasp at which part of the workpiece W the problematic point is likely to occur.

Further, when repetition portions of a machining program machines symmetric shapes with respect to each other, one actual trajectory is displayed reversed with respect to another actual trajectory and, whereby the two actual trajectories can be easily compared with high precision. Further, repetition portions of a machining program machines proportional shapes with respect to each other, one actual trajectory is enlarged or reduced with respect to another actual trajectory, thereby obtaining the same effect.

Figure 7:
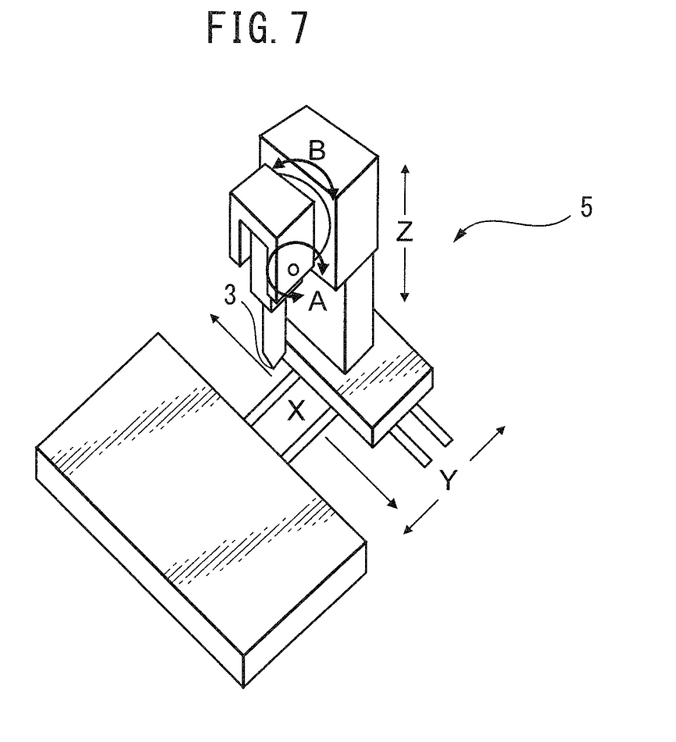
FIG. 7 is a diagram depicting an example of a machine tool.

FIG. 7 is a diagram depicting an example of a machine tool. FIG. 7 depicts a five-shaft machining device as an example of a machine tool. In the five-shaft machining device, X axis, Y axis, and Z axis are linear axes, while A axis and B axis are rotational axes. Coordinates of the five axes at time t are defined as $x(t)$, $y(t)$, $z(t)$, $a(t)$, and $b(t)$.

When an intersection of the two rotational axes, A axis and B axis, is defined as M, the coordinate of the point M is $(x(t), y(t), z(t))$. When the length from the point M to the tool tip point is defined as L, and a position when the tool faces right downward is defined as the reference position (an original point) of A axis and B axis, the coordinates $(X(t), Y(t), Z(t))$ of the tool tip point 3 can be expressed by the following formulas (1) to (3). The trajectory calculation unit 15 may calculate the actual trajectory according to the following formulas:

$$X = x(t) + L \times \cos(a(t)) \times \sin(b(t)) \quad (1)$$

$$Y = y(t) + L \times \sin(a(t)) \quad (2)$$

$$Z = z(t) - L \times \cos(a(t)) \times \cos(b(t)) \quad (3)$$

When the machine tool is a machining center that includes three linear axes (X axis, Y axis, Z axis), the start point coordinate position stored in the start point coordinate storing unit 13 is translated along at least one predesignated linear axis by the above-described movement amount. Then, the trajectory calculation unit 15 calculates the actual trajectory for the corresponding repetition portion using the translated coordinate position as the new machining start position. Thus, the same effect as described above can be obtained by comparing the actual trajectories.

Figure 8:
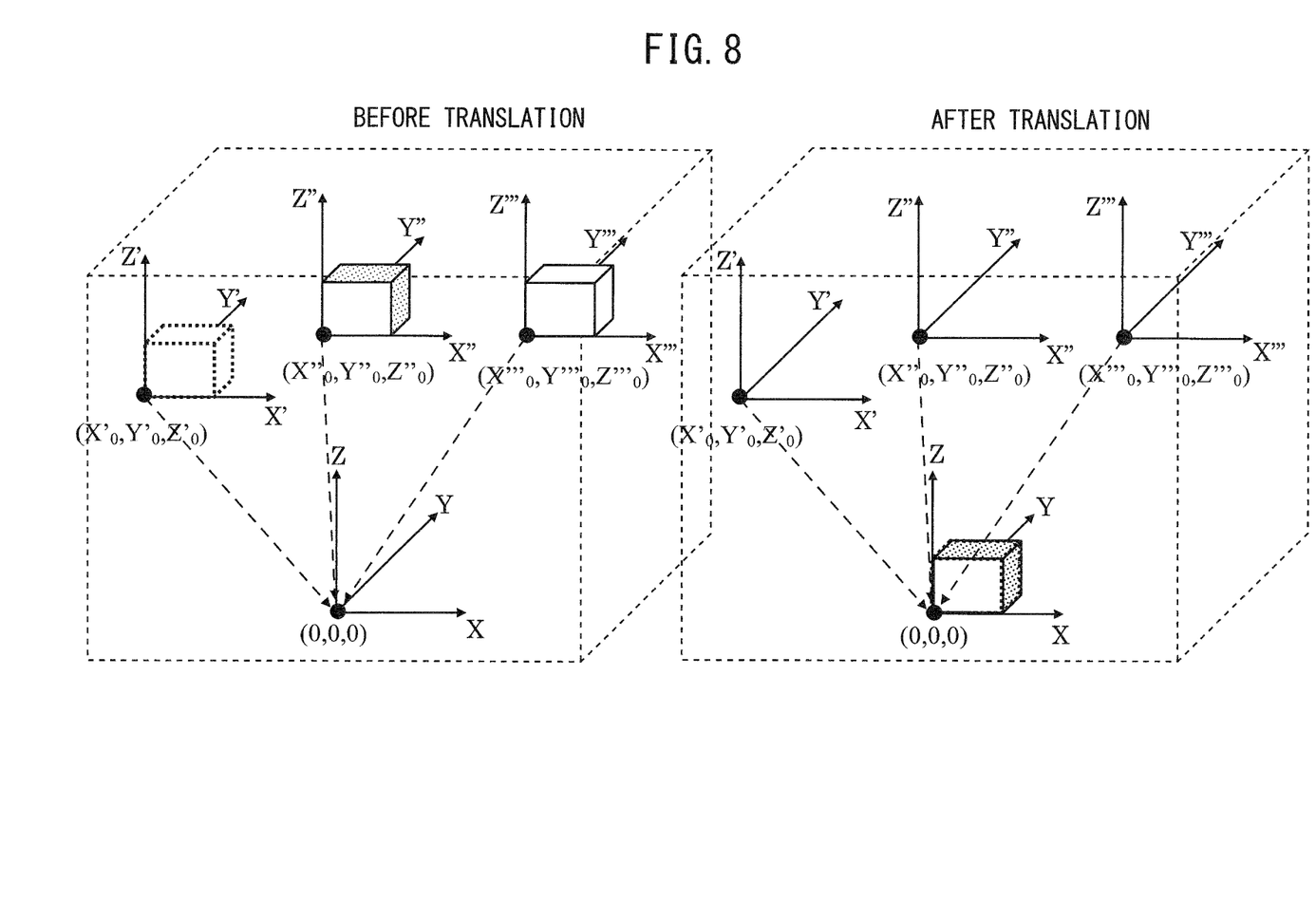
FIG. 8 is a diagram illustrating a translation of a start point coordinate position.

FIG. 8 is a diagram illustrating a translation of a start point coordinate position. The left side of FIG. 8 depicts the state before the translation, and the right side thereof depicts the state after the translation. FIG. 8 assumes a case in which each of start point coordinate positions (X'0, Y'0, Z'0), (X"0, Y"0, Z"0), (X'"0, Y'"0, Z'"0) relating to three repetition portions is translated to a single coordinate position (X0, Y0, Z0) (=(0, 0, 0)).

As an example, a case in which an identical shape is repeated along X axis (the instructions for Y axis and Z axis are the same, while the instructions for X axis is different) will be described. In such a case, as expressed by the following formulas (4) to (6), a difference Dx between the X coordinate of the coordinate value (X0, Y0, Z0) and the X coordinate of each start point coordinate position is calculated, then, each start point coordinate position is translated along X axis by the movement amount Dx.

$$X_0 = X'_0 + D'_x \quad (4)$$

$$X_0 = X''_0 + D''_x \quad (5)$$

$$X_0 = X'''_0 + D'''_x \quad (6)$$

$$(D'_x = X_0 - X'_0, D''_x = X_0 - X''_0, D'''_x = X_0 - X'''_0)$$

In this way, respective three start point coordinate positions (X'0, Y'0, Z'0), (X"0, Y"0, Z"0), (X'"0, Y'"0, Z'"0) is translated to the single coordinate position (X0, Y0, Z0). Then, the three actual trajectories can be superimposedly displayed by calculating the actual trajectories of the repetition portions with respective start point coordinate positions as described above.

The same is true when an identical shape is repeated along Y axis and Z axis, differences Dy and Dz between Y coordinate and Z coordinate of the coordinate value (X0, Y0, Z0) as a comparison point and Y coordinate and Z coordinate of each start point coordinate position, respectively. Then, by translating each start point coordinate position in Y axis and Z axis directions by Dy and Dz, respectively, the three actual trajectories can be superimposedly displayed as described above.

Figure 9:
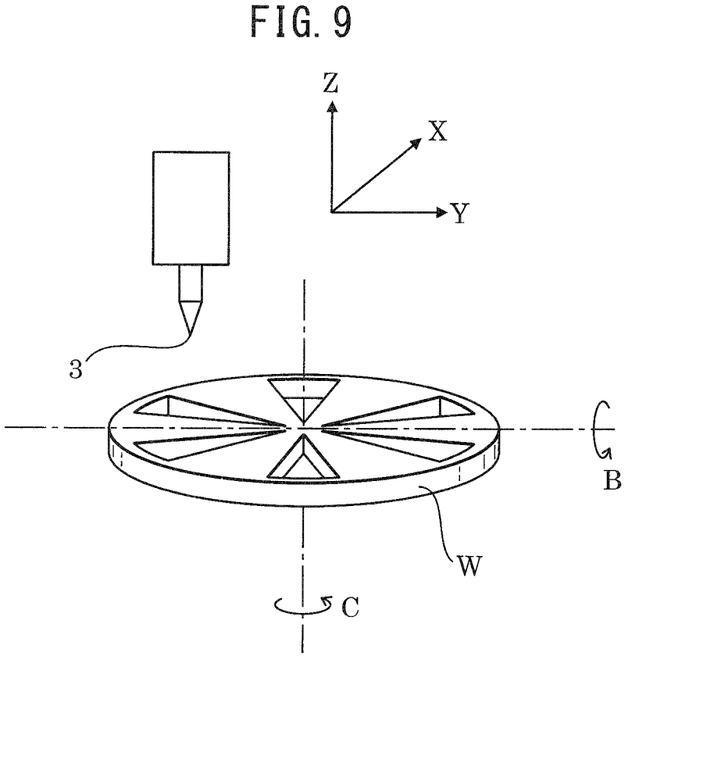
FIG. 9 is a diagram depicting another example of a machine tool.

FIG. 9 is a diagram depicting another example of a machine tool. FIG. 9 assumes a machining center that machines a plurality of rotationally symmetrical shapes using a machining device with four or more axes. As such, FIG. 9 assumes when a disc-shaped workpiece W is machined. In FIG. 9, X axis, Y axis, and Z axis are linear axes, while B axis and C axis are rotational axes.

In such a case, the start point coordinate position stored in the start point coordinate storing unit 13 is rotated around the predesignated rotational axis by the angle as will be described below. This angle is assumed to be calculated by the movement amount determining unit 14. Then, the trajectory calculation unit 15 calculates the actual trajectory for the corresponding repetition portion using the rotated coordinate position as a new machining start position. Thus, the same effect as described above can be obtained by comparing the actual trajectories.

Figure 10:
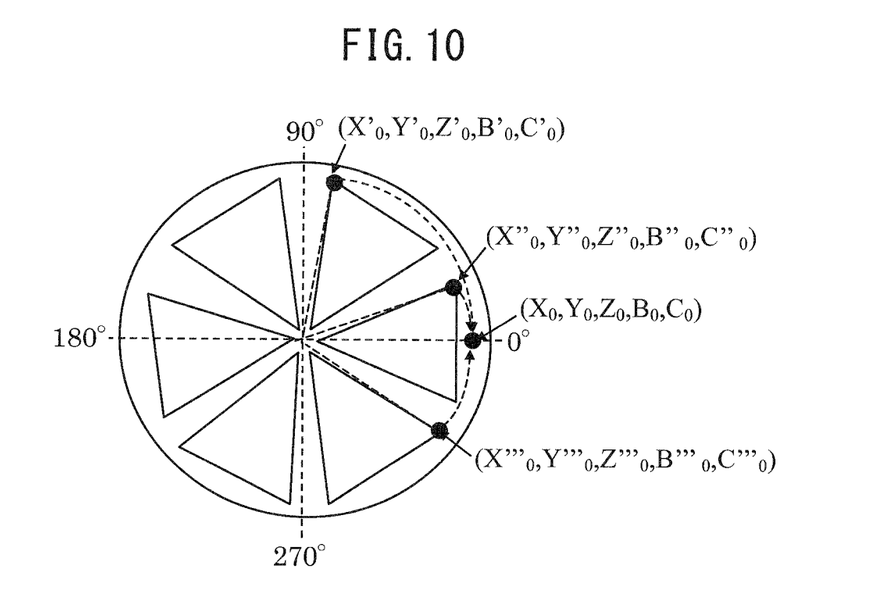
FIG. 10 is a diagram illustrating a rotation of a start point coordinate position.

FIG. 10 is a diagram illustrating a rotation of a start point coordinate position. FIG. 10 depicts a disc-shaped workpiece W. In the workpiece W, a plurality of, for example, six, isosceles triangular holes are formed in a circumferential direction at even intervals. FIG. 10 assumes that each of three start point coordinate positions (X'0, Y'0, Z'0, B'0, C'0), (X"0, Y"0, Z"0, B"0, C"0), (X'"0, Y'"0, Z'"0, B'"0, C'"0) relating to repetition portions are rotated to angle B0 or C0 as reference points around the predesignated rotational axis B or C.

As an example, a case in which an identical shape is repeated around C axis (the rotational axis of the linear axis Z) will be described. In such a case, a difference $\Delta\theta$ between angle C0 and C coordinate of each start point coordinate position is calculated, and each start point coordinate position is rotated around the rotational axis C by the difference $\Delta\theta$. The following formula (7) expresses a case in which the start point coordinate position (X'0, Y'0, Z'0, B'0, C'0) is shifted to a point (X0, Y0, Z0, B0, C0) by the rotation of angle $\Delta\theta$ around the rotational axis C, while fixing the rotational axis B.

$$\begin{bmatrix} X_0 \\ Y_0 \\ Z_0 \\ B_0 \\ C_0 \end{bmatrix} = \begin{bmatrix} \cos\Delta\theta & -\sin\Delta\theta & 0 & 0 & 0 \\ \sin\Delta\theta & \cos\Delta\theta & 0 & 0 & 0 \\ 0 & 0 & 1 & 0 & 0 \\ 0 & 0 & 0 & 1 & 0 \\ 0 & 0 & 0 & 0 & E \end{bmatrix} \begin{bmatrix} X'_0 \\ Y'_0 \\ Z'_0 \\ B'_0 \\ C'_0 \end{bmatrix} \quad (7)$$

$$(E = (C'_0 + \Delta\theta)/C'_0, \Delta\theta = C_0 - C'_0)$$

As for other start point coordinate positions, each angle $\Delta\theta$ is determined according to the formula (7). Then, by rotating by angle $\Delta\theta$, the three start point coordinate positions (X'0, Y'0, Z'0, B'0, C'0), (X"0, Y"0, Z"0, B"0, C"0), (X'"0, Y'"0, Z'"0, B'"0, C'"0) are shifted to the point (X0, Y0, Z0, B0, C0). Then, the three actual trajectories can be superimposedly displayed by calculating the actual trajectories for the repetition portions with respective start point coordinate positions as described above. It will be appreciated by a person skilled in the art that when the start point coordinate positions are rotated, coordinate transformation is adequately applied.

EFFECT OF THE INVENTION

In the first aspect, the shapes of the first actual trajectory and the second actual trajectory corresponding to respective repetition portions can be easily compared. As such, a problematic point in the first actual trajectory and the second actual trajectory can be appropriately grasped.

In the second aspect, when the repetition portion is translated, the shapes of two trajectories can be easily compared.

In the third aspect, when the repetition portion is rotated, the shapes of two trajectories can be easily compared.

In the fourth aspect, the first actual trajectory and the second actual trajectory can be easily compared with the instruction trajectory.

It will be understood by a person skilled in the art that while preferable embodiments are used to describe the present invention, the above-described changes and a variety of other changes, omissions, and additions can be implemented without departing from the scope of the present invention.

What is claimed is:

1. A tool trajectory display device comprising:
   a numerical control device that controls at least one drive shaft of a machine tool based on an instruction position in a machining program;
   an actual position data acquisition unit that acquires an actual position of the at least one drive shaft controlled by the numerical control device;
   a start point coordinate storing unit that stores a plurality of coordinate positions of the at least one drive shaft as start point coordinate positions upon initiation of executing a plurality of repetition portions included in the machining program for repeatedly machining identical shapes or symmetric shapes;

a movement amount determining unit that determines a movement amount of the at least one drive shaft from a first start point coordinate position to a second start point coordinate position among the plurality of start point coordinate positions stored in the start point coordinate storing unit;

a trajectory calculation unit that calculates a first actual trajectory of a tool tip point of the machine tool from the actual position acquired by the actual position data acquisition unit based on the first start point coordinate position after adding the movement amount and a repetition portion corresponding to the first start point coordinate position, and that calculates a second actual trajectory of the tool tip point from the actual position based on the second start point coordinate position and a repetition portion corresponding to the second start point coordinate position; and a display unit that superimposes and displays the first actual trajectory and the second actual trajectory calculated by the trajectory calculation unit.

2. The tool trajectory display device according to claim 1, wherein the at least one drive shaft is a linear axis so that the coordinate positions stored in the start point coordinate storing unit can be translated along the linear axis.

3. The tool trajectory display device according to claim 1, wherein the at least one drive shaft is a rotational axis so that the coordinate positions stored in the start point coordinate storing unit can be rotated around the rotational axis.

4. The tool trajectory display device according to claim 1, wherein the trajectory calculation unit further calculates an instruction trajectory of the tool tip point based on the instruction position in the machining program, and the display unit displays the instruction trajectory superimposed on the first actual trajectory and the second actual trajectory.

* * * * *